(12) United States Patent
Melvin

(10) Patent No.: US 8,882,016 B1
(45) Date of Patent: Nov. 11, 2014

(54) CABLE AND CORD WINDING AND STORAGE SYSTEM

(76) Inventor: Kimberly J. Melvin, Auburn, WA (US)

(*) Notice: Subject to any disclaimer, the term of this patent is extended or adjusted under 35 U.S.C. 154(b) by 194 days.

(21) Appl. No.: 13/492,945

(22) Filed: Jun. 11, 2012

(51) Int. Cl.
*B65H 75/38* (2006.01)

(52) U.S. Cl.
USPC ............ 242/405; 242/395.1; 242/405.2

(58) Field of Classification Search
CPC ............. B65H 75/406; B65H 75/4471; B65H 75/4494; B65H 75/4431
USPC .............. 242/395, 395.1, 405, 405.2–405.3
See application file for complete search history.

(56) References Cited

U.S. PATENT DOCUMENTS

| | | | | |
|---|---|---|---|---|
| 1,485,634 | A | * | 3/1924 | Shillman ................ 242/398 |
| 2,856,470 | A | * | 10/1958 | Hyde ...................... 191/12.4 |
| 3,053,470 | A | * | 9/1962 | Quenot .................. 242/395.1 |
| 3,141,628 | A | * | 7/1964 | Evans et al. ............. 242/396.5 |
| 3,311,319 | A | * | 3/1967 | Campbell ................ 242/394 |
| 3,438,595 | A | * | 4/1969 | West et al. .............. 242/394 |
| 3,617,659 | A | | 11/1971 | Freeman |
| 3,808,382 | A | | 4/1974 | Blanch et al. |
| 4,442,984 | A | | 4/1984 | Bayat |
| 4,685,634 | A | | 8/1987 | Schwartz |
| 4,721,833 | A | | 1/1988 | Dubay |
| 5,641,067 | A | | 6/1997 | Ellis |
| 6,170,775 | B1 | | 1/2001 | Kovacik et al. |
| 6,273,354 | B1 | | 8/2001 | Kovacik et al. |
| 6,517,022 | B1 | * | 2/2003 | Bailey .................... 242/388.1 |
| 6,578,683 | B1 | | 6/2003 | Burke et al. |
| 7,546,969 | B2 | | 6/2009 | Kuramoto |

* cited by examiner

*Primary Examiner* — Sang Kim
(74) *Attorney, Agent, or Firm* — Robert C. Montgomery; Montgomery Patent & Design

(57) ABSTRACT

A wire, cable and cord organizer comprises a winding reel for storing wires, cables, such as computer cords, audiovisual cables, and the like. The organizer can comprise a plurality of different sizes suitable for various wires, cords, cable types and lengths. The organizer includes a hinged cover that protects and allows removal of an enclosed reel. The organizer has a crank handle that can lock in multiple positions to prevent unintended unrolling of a length of wire, cable, or cord stored on the reel. Both ends of the cable protrude from slots in the organizer to provide access to either end of the cable as needed.

10 Claims, 5 Drawing Sheets

CABLE AND CORD WINDING AND STORAGE SYSTEM

RELATED APPLICATIONS

There are currently no applications co-pending with the present application.

FIELD OF THE INVENTION

The presently disclosed subject matter is directed to winding and storing cable, cords, and wires. More particularly, the present invention relates to cable, wire, and cord winders and organizers.

BACKGROUND OF THE INVENTION

Long electrical wires, cables and cords are often used to provide power to yard care equipment and powered tools. Other types of long electrical cables are often used with audio-visual equipment and computers to connect microphones, cameras, recording equipment, and the like. Mechanical wires, cables, and cords are often used as guy wires, temporary fencing, and support structures for flags, ensigns, and other signaling devices. In fact, long wires, cables, and cords, both electrical and mechanical are common devices that while very useful tend to tangle, causing knots, delayed use, damage, aggravation and safety hazards.

When wires, cables, and cords are not being used they are usually coiled up in a loose fashion or manually wound around a reel of some type. However, coiling or winding a long wire, cable, or cord often induces tension twists that causes tangles, knots, and damage when the wire, cable or cord is later uncoiled or unwound. Those tangles and knots can seriously delay deployment and use of the wire, cord, or cable. In addition, tangles and knots can shorten the useable lifespan of the wire, cord, or cable, which can increase costs and waste time.

After being coiled or wound the wire, cable, or cord is often simply tossed into a pile where they cannot only become tangled with other cables, but are subject to damage from contact with other items or become a safety hazard if stepped on.

Accordingly, there exists a need for a device that can easily coil and uncoil long wires, cables, and cords. Beneficially, the device would also protect the wound item from physical damage.

SUMMARY OF THE INVENTION

The principles of the present invention provide for devices that can easily coil and uncoil long wires, cables, and cords in a manner such that the wound items are protected from physical damage.

A winding and storage system that is in accord with the present invention includes a housing that is defined by a circular outer perimeter wall and a housing back wall. The perimeter wall includes an exit port while the housing back wall includes a centrally located input port. A reel having circular and parallel walls that extend outward from a reel hub so as to define a cable space is located in the housing. The reel hub includes a hollow input end that pivots on the input port and a solid end that includes an engagement slot. A reel cable slot is defined between the parallel walls. The hollow hub end and the reel cable slot define a path through the housing back wall into the cable space.

The winding and storage system further includes a cover having a plurality of locking holes adjacent its outer perimeter. The cover is dimensioned to mate with the circular outer perimeter wall. At least one (1) hinge pivotally connects the cover to the housing such that the cover selectively closes the housing. A catch selectively retains the cover in place. A hand crank assembly having a drive spool mechanism passes though and is retained in the cover. The drive spool mechanism includes an engagement tab that mates with the engagement slot when the cover closes the housing. The hand crank assembly further includes a handle having a lock pin that is disposed to selectively engage with a locking hole of the plurality of locking holes. The handle is attached to the drive spool mechanism by a crank locking mechanism that selectively prevents the handle from turning.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
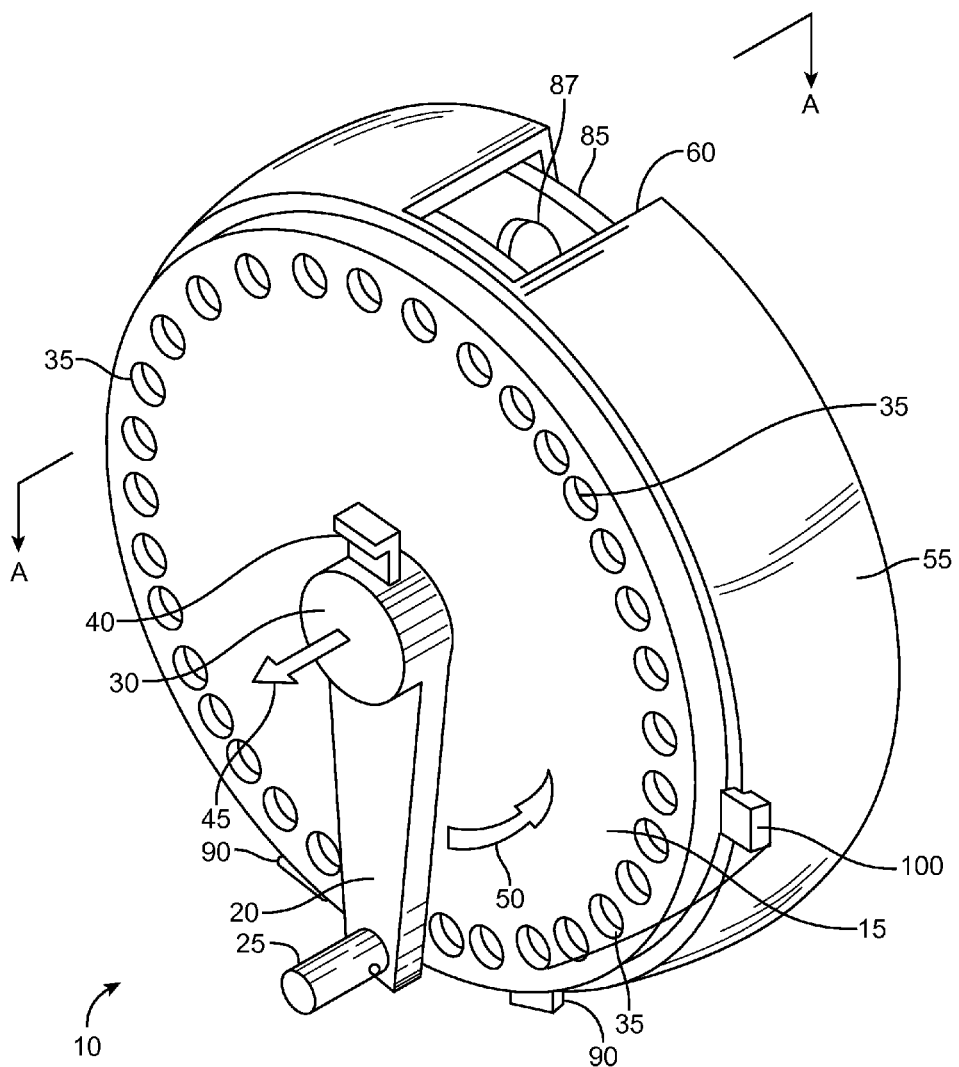
FIG. 1 is an isometric front view of a winding and storage system 10 that is in accord with the preferred embodiment of the present invention.

DESCRIPTIVE KEY 10 winding and storage system
15 cover
20 hand crank assembly
25 crank handle
30 handle hub
35 locking hole
40 crank locking mechanism
45 first direction arrow
47 lock tab
50 second direction arrow
55 housing
60 exit port
65 connection support clips
70 housing cable slot
75 reel hub
77 hub slot
80 cable
82 "L"-shaped slot
85 reel
87 reel view hole
90 hinge
96 third direction arrow
97 back wall
100 holding tab
102 holding slot
105 outer face
110 inner face
120 reel cable slot
130 engagement slot
135 engagement tab 140 drive spool mechanism
145 flip hinge
150 lock pin
155 fastener
157 perimeter wall
160 input port

DETAILED DESCRIPTION OF THE PREFERRED EMBODIMENT

The best mode for carrying out the invention is presented in terms of its preferred embodiment, herein depicted within FIGS. 1 through 4b, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIG. 1, an isometric front view of the storage system 10, the winding and storage system 10 includes a circular cover 15 that selectively closes a circular housing 55. The cover 15 and housing 55 are dimensioned to be approximately the same size and have diameters that depend on the size of a cable 80 (see FIG. 2) that is being used. In practice the cover 15 and the housing 55 are made available in at least three (3) different sizes. A "small" version of about two (2) inches in diameter would be suitable for earphones and similar small cables. A "medium" version of approximately three (3) inches in diameter would be suitable for computer cables and similarly sized cables. A "large" version of approximately four-and-a-half inches (4½ in.) in diameter would be useful for speaker wires, extension cords, or the like. However, for some applications the cover 15 and housing 55 should be eighteen inches (18 in.) or more in diameter for use with even larger cables 80. Thus it should be understood that the storage system 10 is highly flexible and that its size is not a limiting factor. It is also envisioned that different versions of the storage system 10 are color-coded to assist the user in selecting the right version and type of cable 80 for use with each application.

Still referring to FIG. 1, the storage system 10 includes a hand crank assembly 20 comprising a crank handle 25 and a centrally located handle hub 30. The cover 15 is provided with a series of locking holes 35 that are located near the perimeter of the cover 15 as shown. The handle hub 30 is provided with a crank locking mechanism 40 which allows the crank handle 25 to be pulled away from the cover 15 in a perpendicular manner as indicated by a first direction arrow 45 by a distance of approximately one-half inch (½ in.). When pulled out, the hand crank assembly 20 is free to rotate about the handle hub 30 as depicted by a second direction arrow 50 (see also FIGS. 4a and 4b). Also visible in this figure is a portion of the housing 55 with a first exit port 60 visible at its top.

Figure 2:
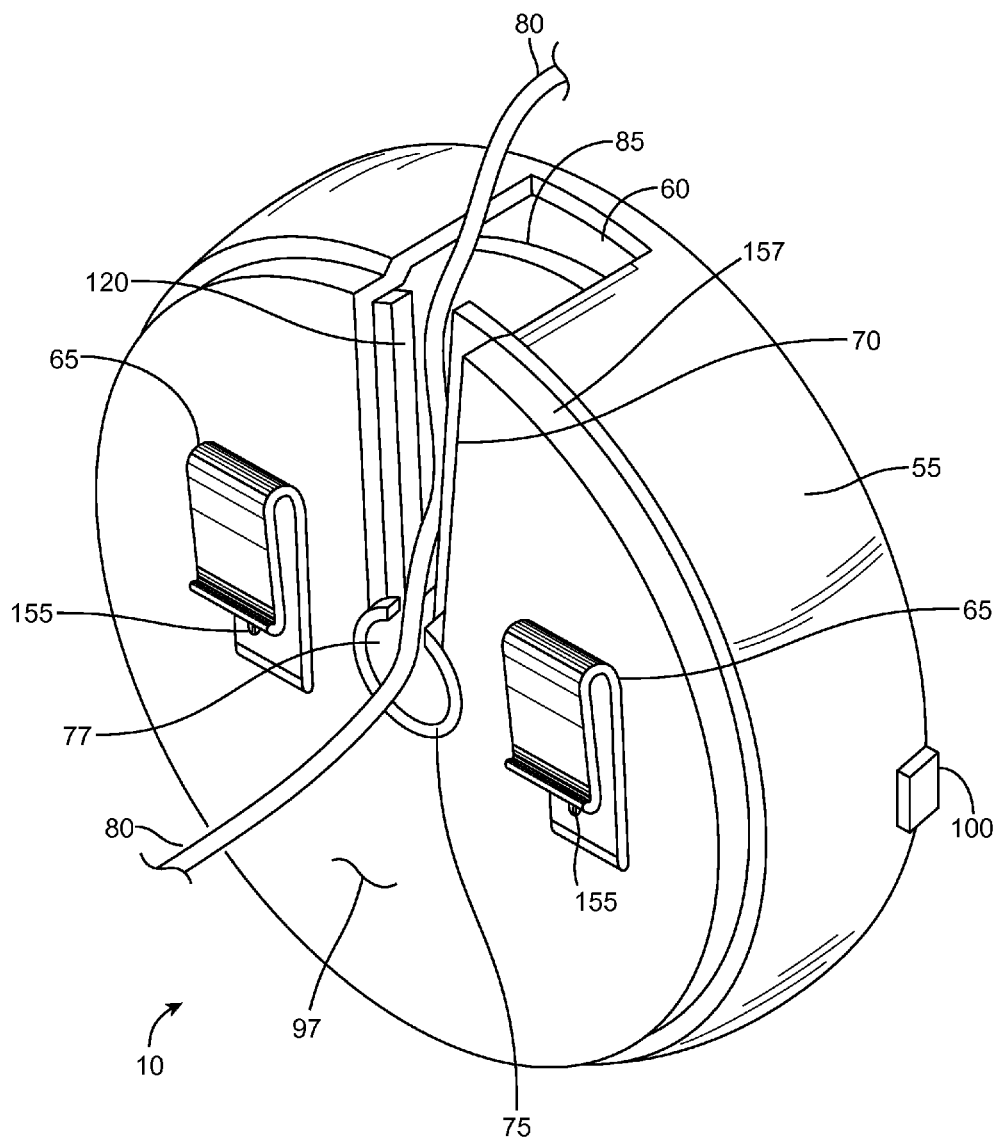
FIG. 2 is an isometric rear view of the winding and storage system 10 shown in FIG. 1.

Refer next to FIG. 2, an isometric rear view of the system 10. This figure more clearly depicts the design of the housing 55 and the first exit port 60. The housing 55 has a back wall 97 that is provided with connection support clips 65 as shown. It is envisioned that the connection support clips 65 are spring loaded clips affixed to the housing 55 using threaded fasteners 155. The support clips 65 enable easy attachment of the system 10 to a belt of a user (also see FIG. 4a). The back wall 97 further includes an input port 160. The housing further includes an outer perimeter wall 157 that is integrally connected to the back wall 97.

The use of the support clips 65 is especially appropriate when the system 10 is used with portable headphones such as while listening to a portable music player. However, in some applications instead of the connection support clips 65 other types of connections such as hook-and-loop-type fasteners, carabiner clips, locks, or the like can be used to fasten the system 10 to other movable or stationary objects. As such, the use of any particular type of connection support clips 65 is not intended to be a limiting factor of the present invention.

Figure 3:
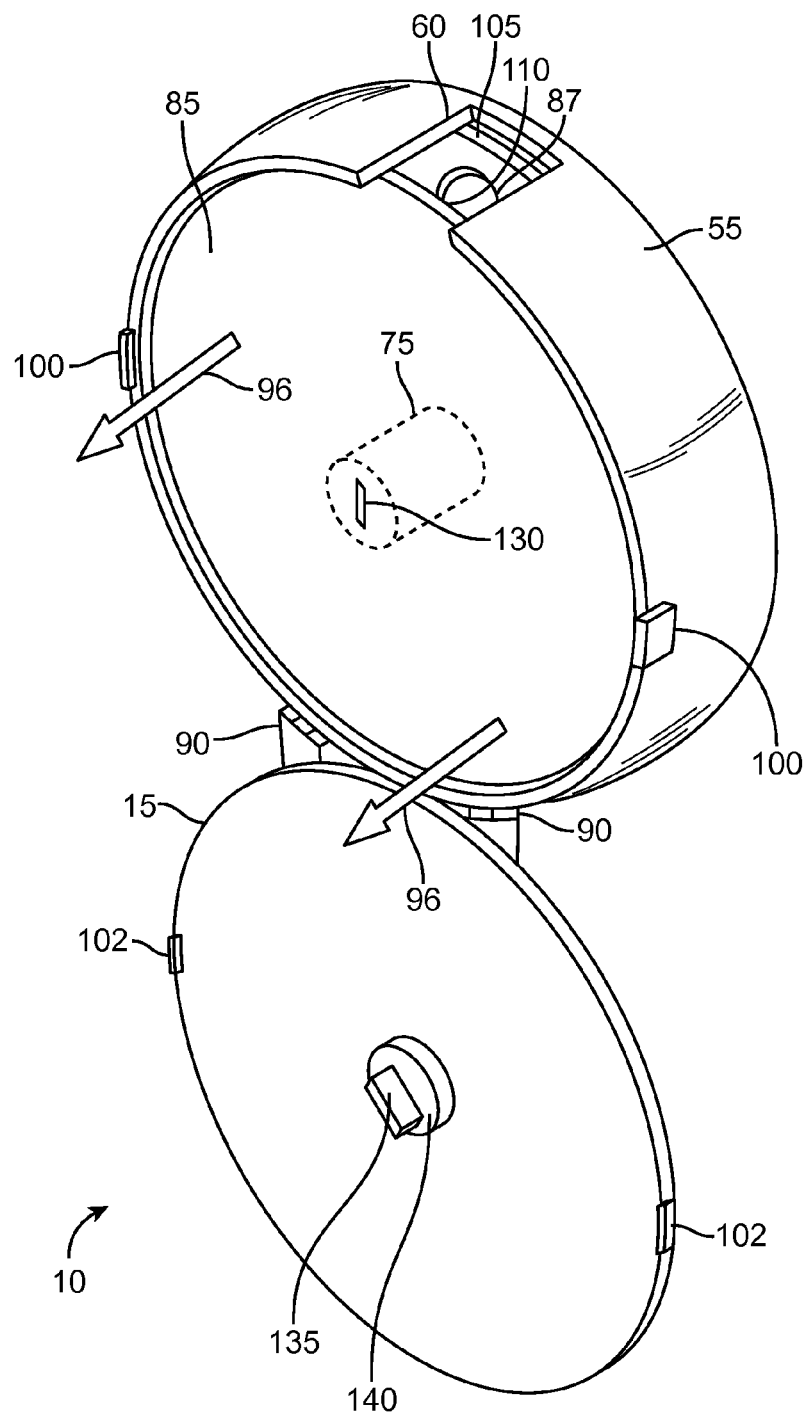
FIG. 3 is an isometric view of the winding and storage system 10 shown in FIGS. 1 and 2 when it is open.

The housing 55 also has a housing cable slot 70 through the back wall 97 which works in conjunction with a reel hub 75 having both a hub slot 77 and a reel cable slot 120 to apply a cable 80 into an interior reel 85 (also shown in FIG. 3). The hub slot 77 and the reel cable slot 120 guide the cable 80 along the hub slot 77 and reel cable slot 120 so as to pass into a reel space defined by the reel 85. The cable 80 is then subsequently routed upward and out an exit port 60 in the housing 55. Extraneous amounts of cable 80 are wound on a reel hub 75 of the interior reel 85 (see FIGS. 3 and 4b).

Referring now to both FIG. 2 and FIG. 3, the reel 85 is securely contained within the housing 55 by fastening the cover 15 against the housing 55 by use of hinges 90 and holding tabs 100. Additionally, the reel cable slot 120 of the reel 85 allows the user to insert and wind an intermediate portion of the cable 80 within the central hollow reel hub 75. Thus winding can occur without access to the endpoints of the cable 80. Once secured, the cable 80 is wound around the reel 85 as necessary to take up the slack, and then exit out the exit port 60 at the top of the housing 55.

FIG. 3 presents an isometric view of the system 10 when the cover 15 is opened. The cover 15 is affixed to the housing 55 with the hinges 90. The hinges 90 are beneficially positioned along the bottom of the housing 55 where they are aligned with each other along a common centerline. When the cover 15 is closed it is secured via the holding tab 100 which mates with corresponding holding slots 102 in the cover 15 by a snap or friction fit.

The reel 85 is removable and centrally located in the housing 55. The reel 85 has a circular outer face 105 and a parallel circular inner face 110. The outer face 105 is provided with a series of reel view holes 87 for observing how much cable 80 is within the system 10 when viewed through the housing cable slot 70 of the housing 55 (also see FIGS. 1 and 2).

The inner face 110 has a centrally located engagement slot 130 which mechanically connects to a matching engagement tab 135 of a drive spool mechanism 140 of the hand crank assembly 20. The engagement of the engagement slot 130 and engagement tab 135 allows for the reel 85 to be turned as necessary to reel in or play out additional cable 80 during use of the system 10 (see FIGS. 4a and 4b).

Refer now again to FIG. 3. The system 10 allows fast and easy removal of the reel 85 as indicated by the third direction arrows 96. Removal of the reel 85 enables a user to either load or unload the reel 85 with a different type of cable 80.

Figure 4A:
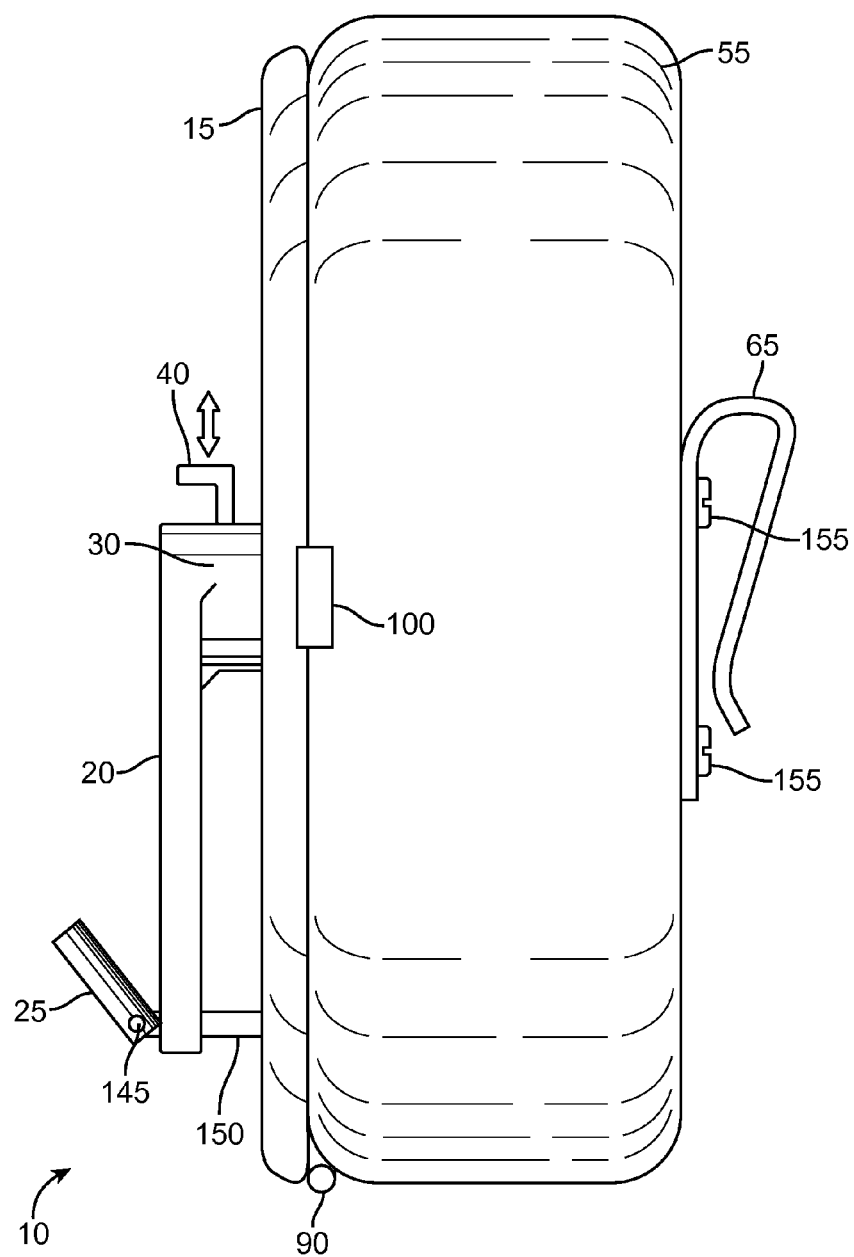
FIG. 4*a* is a side view of the winding and storage system 10 shown in shown in FIGS. 1, 2 and 3; and, FIG. 4*b* is a section view of the winding and storage system 10 taken along section line A-A of FIG. 1.
Figure 4B:
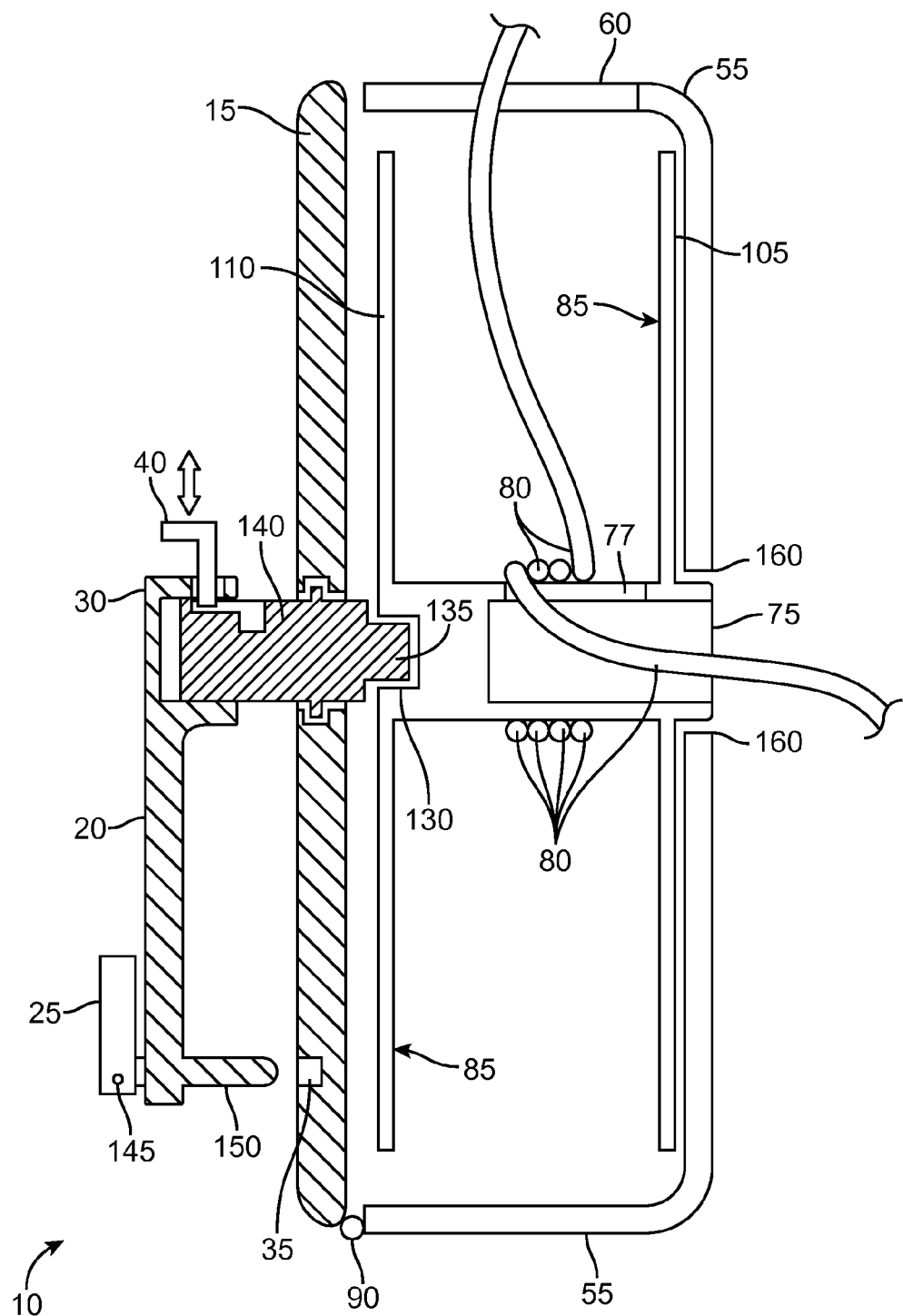

Refer now to FIGS. 4a and 4b respectively, a side view and a section view of the system 10. FIG. 4a clearly depicts the connection support clips 65 on the back of the housing 55, as well as the hinges 90 and the holding tabs 100 when the cover 15 is attached to the housing 55. As shown, the crank handle 25 is connected to the hand crank assembly 20 via use of a flip hinge 145 which permits the crank handle 25 to swing out of the way when not needed or so as not to cause an obstruction.

FIG. 4b shows an "L" shaped slot 82 in the drive spool mechanism 140. The "L"-shaped slot 82 selectively receives the crank locking mechanism 40 within the deep leg of the "L"-shaped slot 82. This locks the handle hub 30 close to the cover 15. This causes the lock pin 150 to engage with a locking hole 35. When the crank locking mechanism 40 is retracted from the deep leg of the "L"-shaped slot 82 the handle hub 30 can move away from the cover 15, which disengages the lock pin 150 from the locking hole, allowing the handle crank assembly 20 to turn.

Also visible is a lock pin 150 on the rear of the hand crank assembly 20. The lock pin 150 selectively engages with one of the locking holes 35 when the hand crank assembly 20 is pushed in. This locks the reel 85 in a particular position so that it will not allow release of any more cable 80 (see also FIG. 1). Disengagement of the lock pin 150 is accomplished by releasing the crank locking mechanism 40 from the drive spool mechanism 140 of the handle hub 30. In use, the user would lift the crank locking mechanism 40 while pulling the hand crank assembly 20 outward for a distance of approximately one-half inch (½ in.) to disengage the lock pin 150 from the locking hole 35. This frees the hand crank assembly 20 so that it can turn. When a satisfactory amount of cable 80 is removed from the reel 85 the hand crank assembly 20 is pushed back in and the crank locking mechanism 40 pressed downward to engage the lock pin 150 with one (1) of the locking holes 35.

The drive spool mechanism 140 further comprises the integral and protruding engagement tab 135 which provides interlocking engagement with the corresponding engagement slot portion 130 of the reel hub 75 upon closing of the cover portion 15. Turning the hand crank assembly 20 by the user results in rotational motion of the interior reel 85 to take up the cable 80 (also see FIG. 3). In addition, the drive spool mechanism 140 includes lock tab 47 that locks the drive spool mechanism 140 to the inside of the cover 15.

It is envisioned that other styles and configurations of the present invention can be easily incorporated into the teachings of the present invention; only one particular configuration is shown and described for purposes of clarity and disclosure and not by way of limitation of scope.

The preferred embodiment of the present invention can be used by the common user in a simple and effortless manner with little or no training. It is envisioned that the system 10 would be constructed in general accordance with FIG. 1 through FIG. 4b. The system 10 is envisioned as being made primarily of plastic components in an injection molding process. Prior to use, a user would select a suitable size of the system 10 to be used based upon the outer diameter of the user supplied cable 80 as well the total length of the cable 80.

Actual use of the system 10 would commence by aligning the housing cable slot 70 and the reel cable slot 120, and inserting an intermediate portion of the cable 80 through the open end of the reel hub 75, up through the hub slot 77, and out of the exit port 60. The user may then wind an appropriate length of cable 80 by pulling out the hand crank assembly 20 from the center hub drive spool mechanism 140 by lifting the crank locking mechanism 40. This releases the lock pin 150 from a corresponding locking hole 35, thereby allowing the hand crank assembly 20 and subsequently the interior reel 85 to turn. As the reel 85 turns, excess cable 80 will be wound onto the reel 85. Once the desired length of cable 80 is wound, the user will push in the hand crank assembly 20 and secure it by pressing down the crank locking mechanism 40 to insert the lock pin 150 into a corresponding locking hole 35. This process can be reversed to feed-out a length of cable 80 from the system 10, or to readjust the overall length of the cable 80 during different applications.

Another reel 85 may be installed or the original reel 85 removed from the housing 55 by winding the excess cable 80 onto the reel 85 as previously described; opening the cover portion 15 of the system 10 by disengaging the holding tabs 100 from the holding slots 102; folding the cover 15 downward away from the housing 55; and, sliding and removing the reel 85 from the housing 55. At this time, a user may load an empty reel 85 or a reel 85 containing a different style or gauge of cable 80 into the housing 55 by routing a stationary end of the cable 80 out through the reel hub 75; sliding the reel 85 into the housing 55; routing the free end portion of the cable 80 out of the exit port portion 60 of the housing 55; and, closing and securing the cover 15 using the hinges 90 and fastening holding tabs 100.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A winding and storage system, comprising:
   a housing defined by a circular outer perimeter wall with an exit port and an integrally attached housing back wall having a centrally located cable input port;
   a reel having circular and parallel walls that extend outward from a reel hub to define a cable space, said reel hub having a hollow input end that pivots on said cable input port, a solid opposed end having an engagement slot, and a reel cable slot defined between said parallel walls, wherein said hollow input end and said reel cable slot define a path through said housing back wall into said cable space;
   a cover having a plurality of locking holes adjacent the cover perimeter, wherein said cover perimeter is dimensioned to match said circular outer perimeter wall;
   at least one hinge pivotally connecting said cover to said housing such that said cover selectively closes said housing;
   a catch for selectively retaining said cover in place to close said housing; and,
   a hand crank assembly including a drive spool mechanism that passes though and is retained in said cover, said drive spool mechanism having an engagement tab that mates with said engagement slot when said cover closes said housing, said hand crank assembly further including a handle having a lock pin disposed to selectively engage one locking hole of said plurality of locking holes, said hand crank assembly attached to said drive spool mechanism by a crank locking mechanism for selectively preventing said handle from turning.

2. The winding and storage system according to claim 1, further including at least one connection support clip attached to said housing back wall.

3. The winding and storage system according to claim 1, wherein said catch is comprised of a holding tab attached to said housing and a mating holding slot defined in said cover.

4. The winding and storage system according to claim 1, wherein said hand crank assembly includes a flip hinge pivot connected to said handle.

5. The winding and storage system according to claim 1, wherein said crank locking mechanism selectively enables said handle to move away from said cover to disengage said lock pin from said locking hole of said plurality of locking holes.

6. The winding and storage system according to claim 5, wherein said handle can turn said hub when said lock pin is disengaged from said one locking hole of said plurality of locking holes.

7. The winding and storage system according to claim 6, wherein said handle cannot turn said hub when said lock pin is engaged with said one locking hole of said plurality of locking holes.

8. The winding and storage system according to claim 7, wherein said hand crank assembly includes a handle hub engaged to rotate said drive spool mechanism.

9. The winding and storage system according to claim 8, wherein said handle hub includes an "L"-shaped slot for receiving said crank locking mechanism.

10. The winding and storage system according to claim 9, wherein when one section of said "L"-shaped slot receives said crank locking mechanism.

* * * * *